US008727167B2

(12) United States Patent
Soh

(10) Patent No.: US 8,727,167 B2
(45) Date of Patent: May 20, 2014

(54) APPLICATOR-RECEPTACLE SECURING SYSTEM

(75) Inventor: Hock Seng Soh, Singapore (SG)

(73) Assignee: Nestec S.A., Vevey (CH)

( * ) Notice: Subject to any disclaimer, the term of this patent is extended or adjusted under 35 U.S.C. 154(b) by 124 days.

(21) Appl. No.: 13/125,223

(22) PCT Filed: Oct. 20, 2009

(86) PCT No.: PCT/SG2009/000385
§ 371 (c)(1),
(2), (4) Date: Apr. 20, 2011

(87) PCT Pub. No.: WO2010/047660
PCT Pub. Date: Apr. 29, 2010

(65) Prior Publication Data
US 2011/0192846 A1   Aug. 11, 2011

(30) Foreign Application Priority Data
Oct. 20, 2008   (WO) ................ PCT/SG2008/000403

(51) Int. Cl.
*B65D 51/18* (2006.01)
*B65D 51/20* (2006.01)

(52) U.S. Cl.
USPC ............... 220/258.1; 220/255.1; 220/256.1

(58) Field of Classification Search
CPC ...... B65D 51/228; B65D 51/20; B65D 51/18; B65D 47/121; B65D 2251/0093; B65D 2251/0018; B65D 17/506
USPC .......... 215/221, 222, 224, 228, 263; 220/254.8, 254.1, 255.1, 255, 256.1, 220/258.3, 258.1, 258.5, 259.5, 80, 85–88; 292/1, 56, 111, 114, 98, 101, 162, 140
See application file for complete search history.

(56) References Cited

U.S. PATENT DOCUMENTS 2,423,582 A * 7/1947 Coleman ...................... 215/252
4,345,691 A * 8/1982 Burke ........................... 215/216
(Continued)

FOREIGN PATENT DOCUMENTS

CN   2321730   6/1999
CN   2360351   1/2000
(Continued)

OTHER PUBLICATIONS

PCT International Search Report for Application No. PCT/SG2009/000385—Mailing Date of Jan. 21, 2010, 4 Pages.
(Continued)

*Primary Examiner* — J. Gregory Pickett
*Assistant Examiner* — Kaushikkumar Desai
(74) *Attorney, Agent, or Firm* — K&L Gates LLP

(57) ABSTRACT

The present invention relates to a securing system (500). The securing system (500) is comprised of a first device having a first opening, and a first connecting portion formed at or frangibly connected to the periphery of the first opening; and a second device having a second opening, and a second connecting portion formed at the periphery of the second opening. The first connecting portion is engaged with the second connecting portion for connecting the first opening with the second opening. The first connecting portion is essentially configured to non-reattachably deform, or frangibly detached from the periphery of the first opening, when the first device is caused to be disconnected from the second device at the connected first and second openings for disabling the first device from being re-attachable with the second device at the first and second openings. The first device is also further adapted to serve as an intermediate connector between a third and the second devices at the second and a third openings. The first device is adapted to be non-detachably connected to a third device. If the first and the second devices are non-reattachably connected, when the first device is caused to be disconnected from the second device, the third device, which is non-detachably connected to the first device, is disabled from being re-attachable with the second device.

31 Claims, 5 Drawing Sheets

(56) References Cited

U.S. PATENT DOCUMENTS

| | | | |
|---|---|---|---|
| 4,667,853 A | | 5/1987 | Kruger |
| 4,709,835 A | | 12/1987 | Kruger et al. |
| 4,736,859 A | * | 4/1988 | Mayes et al. ............ 215/330 |
| 5,143,237 A | | 9/1992 | Lindsey et al. |
| 5,328,046 A | | 7/1994 | Kutz et al. |
| 5,360,127 A | * | 11/1994 | Barriac et al. ............ 215/263 |
| 5,685,445 A | * | 11/1997 | Dobbs ............ 215/330 |
| 5,690,242 A | * | 11/1997 | Campbell, Jr. ............ 215/273 |

FOREIGN PATENT DOCUMENTS

| | | |
|---|---|---|
| CN | 2597371 | 1/2004 |
| CN | 1575708 | 2/2005 |
| DE | 3409142 | 9/1985 |
| GB | 1024287 | 3/1966 |
| GB | 1339341 | 12/1973 |
| GB | 1488372 | 10/1977 |

OTHER PUBLICATIONS

PCT Written Opinion of the International Searching Authority for Application No. PCT/SG2009/000385—Mailing Date of Jan. 21, 2010, 5 Pages.

International Search Report—PCT/SG2009/000385—mailing date Jan. 21, 2010, 4 pages.

Written Opinion of the International Searching Authority—PCT/SG2009/000385—mailing date Jan. 21, 2010, 5 pages.

* cited by examiner

APPLICATOR-RECEPTACLE SECURING SYSTEM

FIELD OF THE INVENTION

The present invention relates to an applicator-receptacle securing system.

BACKGROUND ART

Various types of dispensing devices may be accordingly adapted to dispense pourable material such as granular or like material, liquid, or any other pourable items, that may be associated with from beverage, seasoning powder to soap. It should also be noted that the mechanism presents therein, if possible, might also be extended for use in other dispensable items such as candy, tablets, sugar cube, and etc. Such dispensing devices, particularly those intended for pourable material such as the granular or like material, liquid and any other pourable items has been associated with some disadvantages that are particularly of interest of the present invention.

Granular or like materials such as sugar, creamer, coffee powder, seasoning powder, granulated salt, chili powder and etc. are required to be kept in an airtight condition and hence pre-packaged. Furthermore, the need to transport the supply of such materials in a package has also led to the usage of the convenient container that is provided with closure such as a screw cap, a snap-on cover, or etc.

Apart from that, there has also appeared a need for a dispensing device that can store the said material in the same container and that at the same time can conveniently dispense the said materials from the container. As a result, a dispensing device that can satisfy the above-mentioned needs has conventionally been devised. Although the conventional dispensing devices are viewed as can satisfy the above-mentioned needs, there still appear certain drawbacks that are of immense concern to the suppliers of dispensable packaged goods.

It has been a mutual practice that a supplier would provide the dispensing machines, for the said goods, to the vendors in good faith and in return, the vendors would purchase the packaged goods only from the supplier and sell the goods to the end consumers as contracted. However, there have been numerous occurrences where the vendors illicitly attempt to adapt competitor's package to be dispensed using their contracted suppliers' dispensing devices without their suppliers' consent.

The conventional dispensing machine, as in most cases, at the dispensing part is typically comprised of a dispensing stand, a detachable dispensing applicator and a product container. A user would usually be required to fasten the goods' container to the dispensing applicator and insert the assembly into the stand. Since the containers are typically of the screw-cap type, it is therefore usual that the screw thread formed at the neck of the container is prudently received at the mouth of said applicator. As such, it is apparent that there is no security system that is present in these conventional machines to prevent the user/vendor from refilling the container with a competitor's product and dispensing the product with the supplier's machines. In addition, there also exists another problem where the user may adapt a competitor's container filled with a competitor's product to the said dispensing device, since the said screw thread at the container is of a standard design. With that, it is more inevitable that the user may repetitiously be attempting the above for unlimited usages.

One such dispensing machine is of the subject of the patent document no. GB 1,024,287 which describes a dispenser for dispensing serve-sized quantities of powdered coffee, sugar and other powdered or granular ingredients of beverages. The dispenser is provided, for a fluent material, e.g. powdered, coffee, milk, tea or sugar, comprising a container, a material outlet neck extending downwardly from said container, a butterfly valve in said neck comprising a spindle piercing the neck and valve vane thereon, and valve operating means adapted to shift said butterfly valve rapidly from one closed position through an intermediate open position to another closed position. However, there is no mention of any mechanism that can overcome the problems as afore-mentioned.

Also in the same subject is of Edward (G.B. Pat. No. 1,488,372), which describes a dispenser for dispensing pre-determined amounts of particulate or granular material such as sugar, coffee, and etc. The dispenser is comprised of a bucket valve with a base, sidewalls and a partition defining a pair of metering chambers, the valve being pivoted on a spindle to empty either of the chambers. The valve can be tilted by a lever connected to a knob. A latching mechanism is also provided if the dispenser is used in a coin operated mechanism. This dispenser also has no mechanism to prevent adaptation of a competitor's package into the said applicator.

As a result, the suppliers are left at such an inexorable position. As a preventive measure; the suppliers of concern are constantly required to be arduously vigilant of these vendors' interminable attempts. The constant monitor, in the long run, would cause a lot of unnecessary losses to the suppliers. Despite the dire efforts performed at the supplier's end, it has not been still met with a satisfactory result. Therefore, a dispensing device that can eliminate the afore-mentioned drawbacks is very much needed.

SUMMARY OF THE INVENTION

Accordingly, to solve the disadvantages and drawbacks of the prior art, there is provided an applicator-receptacle securing system.

According to the first aspect of the present invention, the securing system is comprised of a first device and a second device. The first device is comprised of a first opening, and a first connecting portion formed at the first periphery that forms the first opening. The second device is comprised of a second opening, and a second connecting portion formed at the second periphery that forms the second opening.

The first connecting portion is configured to be engaged with the second connecting portion for connecting the first opening with the second opening. The first connecting portion is also configured to non-reattachably deform when the first device is caused to be disconnected from the second device at the connected first and second openings for disabling the first device from being re-attachable with the second device at the first and second openings.

According to a second aspect of the present invention, the first connecting portion is adapted as a non-reattachable portion. The non-reattachable portion is frangibly connected to the first periphery. The non-rettachable portion is configured to be frangibly detached from the first periphery, when the first device is caused to be disconnected from the second device at the connected first and second openings, for disabling the first device from being re-attachable with the second device at the first and second openings.

According to a third aspect of the present invention, the first device is an intermediate connector between a third and the second devices at the second and a third openings. The first opening is extended through the first device as a conduit thereof. The first device is non-detachably connected to a third device. An inner connecting component is formed on the inner wall of the first periphery. The third device is comprised of a third opening. The third periphery, that forms the third opening, comprises a third connecting component formed on the outer wall thereof. The inner connecting component is non-detachably engaged with the third connecting component such that the first device and the third device are non-detachably connected at the first and the third openings. If the first and the second devices are non-reattachably connected, when the first device is caused to be disconnected from the second device, the third device, which is non-detachably connected to the first device, is disabled from being re-attachable with the second device.

It is an object of the present invention to provide a securing system that enables a first device to be non-reattachably connected with a second device from opening to opening.

It is also an object of the present invention to provide a unique engagement means to only receive the non-reattachable connecting portion formed at the openings of the corresponding device and also to hinder the other forms of engagement means from being able to be connected with the engagement means of the corresponding device.

It is also an object of the present invention to disable a first device at its opening from being re-attachable to a second device at its corresponding opening whereby the first device is configured to be connected once and to be not able to re-attach with a second device correspondingly at the openings whereas the second device at its corresponding opening is facilitated to be able to receive a new first device that has not been used for an attachment and that has not been disabled for a reattachment, unlimitedly.

It is a further object of the present invention to provide a solution to a package adapted as the first device (i.e. plastic receptacle, package, bottle or pouch etc.) for one-time usage only with an applicator adapted as the dispensing conduit, by means of non-reusably deforming or non-reattachably detaching the non-reattachable portion of the package when the package is being disconnected from the applicator of the dispensing device. Adaptation of other packages (of other competitors) to the said applicator is therefore prevented.

It is a further object of the present invention to prevent re-using or refilling a package that has been disabled from reattachment, therefore facilitating one-time usage of a package and further no refill is allowed.

It is a final object of the present invention to provide an intermediate connector having all the features of the securing system that is capable of being non-detachably connected to a conventional receptacle or package such that the above same objectives of the securing system can be adapted for the conventional receptacle or package.

The present invention consists of certain novel features and a combination of parts hereinafter fully described and illustrated in the accompanying drawings and particularly pointed out in the appended claims; it being understood that various changes in the details may be without departing from the scope of the invention or sacrificing any of the advantages of the present invention.

BRIEF DESCRIPTION OF THE DRAWINGS

For the purpose of facilitating an understanding of the invention, there is illustrated in the accompanying drawings the preferred embodiments from an inspection of which when considered in connection with the following description, the invention, its construction and operation and many of its advantages would be readily understood and appreciated.

DETAILED DESCRIPTION OF THE PREFERRED EMBODIMENTS

Figure 1:
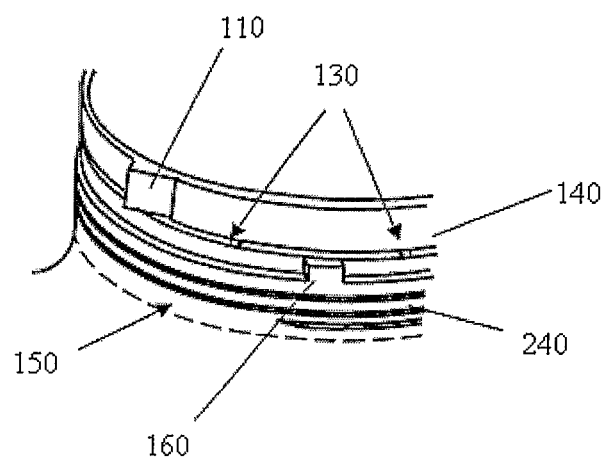
FIG. 1 is an isometric view of the neck of a package of the present invention.

The present invention relates to a securing system 500. More particularly, the present invention relates to a securing system 500 that allows a receptacle 250 to be non-reattachably connected with an applicator 220 from opening to opening. Hereinafter, the securing system 500 shall be described according to the preferred embodiments of the present invention and by referring to the accompanying description and drawings. However, it is to be understood that limiting the description to the preferred embodiments of the invention and to the drawings is merely to facilitate discussion of the present invention and it is envisioned that those skilled in the art may devise various modifications without departing from the scope of the appended claim.

The securing system 500 is essentially provided to enable a first device to be non-reattachably connected with a second device from opening to opening. It is also an objective of the securing system 500 of the present invention to provide a unique engagement mechanism wherein the connecting portion of the second device is adapted to exclusively receive the type of connecting portion that is present at a non-reattachable portion 140 of the first device. In other words, other forms of engagement means such as the screw thread is hindered from being able to be connected with the engagement means present at the corresponding device of the present invention. The unique engagement mechanism will be hereinafter described in greater detail.

In order to provide the above-solutions, the securing system 500 is preferably comprised of a first device having a first opening and a first connecting portion formed at a first periphery that forms the first opening, and a second device having a second opening, and a second connecting portion formed at a second periphery that forms the second opening. The first connecting portion is preferably configured to be correspondingly engaged with the second connecting portion to connect the said first and second openings.

In addition, the first connecting portion is preferably comprised of at least one securing element whereas the second connecting portion is preferably comprised of at least one receiving element. When the first and the second connecting portions are connected, the securing element is preferably received and retained in the receiving element.

In addition, the first periphery preferably comprises at least one collar formed at the engagement wall thereof, and the second periphery preferably comprises at least one receiver formed at the engagement wall thereof. It is also preferable that the receiver is formed on the second connecting portion. The collar is preferably configured to be correspondingly received into the receiver when the first and second openings are in the connected position; and the collar is further preferably configured to restrict substantially any movement of the first opening in relative to the second opening.

According to a first embodiment, when the first device is caused to be disconnected from the second device at the connected openings, the first connecting portion is preferably formed such that it is non-reattachably deformed to the extent that the first device is substantially disabled permanently from being re-attachable with the second device at their respective openings.

Still in accordance to the first embodiment, the securing element is preferably configured as the weakest part of the first connecting portion such that when the first and second connecting portions are disconnected, the securing element is preferably caused to be non-reattachably deformed to the extent that it is no longer reusably re-attachable with the said receiving element at the second periphery of a second device. The said second connecting portion is also preferably capable of engaging a first connecting portion of other first device that has not been non-reattachably deformed as a result of being caused to be disconnected from a second device at the second opening.

According to a second embodiment of the present invention, the first connecting portion is preferably configured as a non-reattachable portion. It is preferred that the non-reattachable portion is frangibly connected to the first periphery. The first and second devices are preferably connected at their respective openings by means of engaging the non-reattachable portion with the second connecting portion. When the first and second devices are disconnected at the openings, the non-reattachable portion is preferably frangibly detached from the periphery of the first opening such that consequently, the first device is substantially disabled permanently from being re-attachable with the second device at the openings.

According still to the second embodiment of the present invention, once the first device and the second device are connected at the respective openings; the securing element is preferably received and retained within the receiving element. As the securing element is securely retained at the receiving element, it is preferred that the non-reattachable portion is frangibly detached from the periphery of the first opening once the first and second devices are caused to be disconnected at the said openings. Consequently, the non-reattachable portion is therefore preferably detached from the first periphery and is substantially disabled permanently from being reattachable with the second opening again or any other opening of a second device.

In accordance still to the second embodiment of the present invention, it is also preferred that the first device is preferably further comprised of at least one frangible connecting element that is formed at the preferred connection points between the non-reattachable portion and the first periphery. The frangible connecting element is preferably configured to frangibly connect the non-reattachable portion to the first periphery. The frangible connecting element is also preferably configured as the weakest part thereof such that the disconnection of the first and second devices at the said openings causes the frangible connecting element to rupture.

Referring now to different figures of the drawings, there is shown the securing system 500 according to the most preferred embodiment of the present invention. With reference to FIG. 1, a breakable neck 140, which is preferably resiliently non-reattachably deformable, is preferably connected to a first device's lower neck 150 by means of a plurality of retaining points 130. The said breakable neck 140 is preferably comprised of a plurality of tapered keys 110 formed at the circumference of the neck 140 adapted for engaging/securing to a second device.

Underneath the said retaining points 130, preferably, there are also collars 160 preferably formed on the circumference of the lower neck 150, with the aim to restrict both linear or circular movements of the first device during the engagement with the second device. The said lower neck 150 is also preferably comprised of an engagement thread such as a screw thread 240 formed below the collars 160 for engagement with a closure 260 such as a screw cap (not shown).

Figure 2:
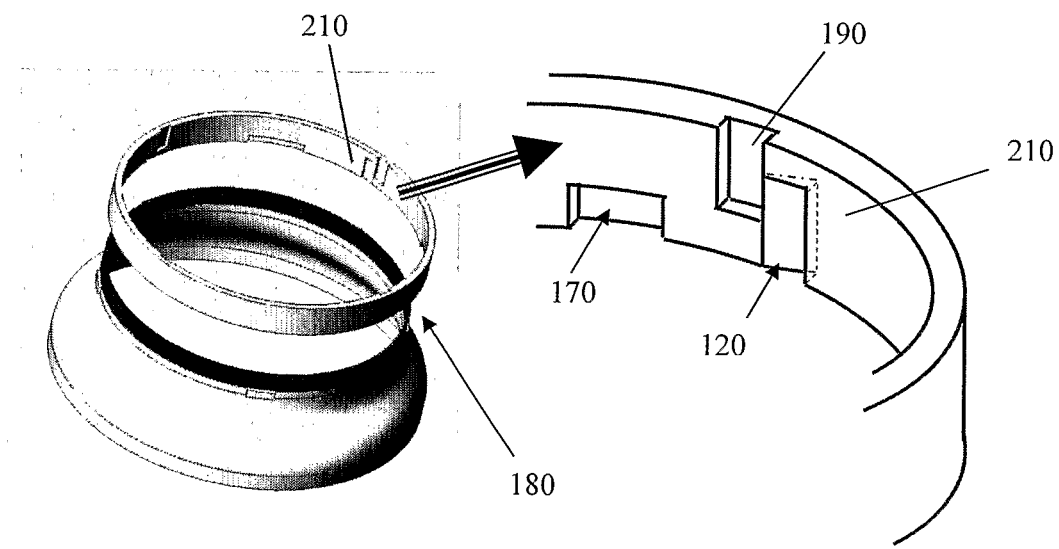
FIG. 2 is an isometric view of the inlet of an applicator of the present invention.
Figure 3:
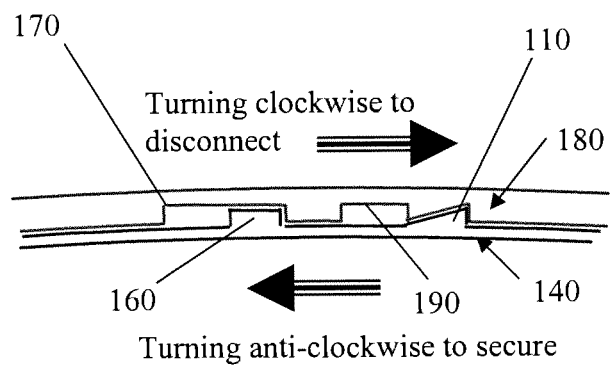
FIG. 3 is a diagrammatic cross-sectional view showing the securing method for the securing system of the present invention.
Figure 4:
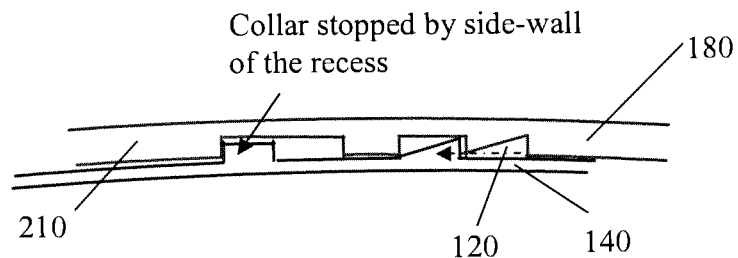
FIG. 4 is a diagrammatic cross-sectional view showing the securing method for the securing system of the present invention.

Referring now to FIG. 2, the second device is preferably comprised of tapered slots 120, formed at a receiving portion 210 of the second device thereof, that are adapted for engaging with the first device. It is preferred that the receiving portion 210 is adapted as the second connecting portion that is formed at the second periphery. The tapered slots 120 are preferably defined as key-ways 120 that is capable of being meshed with the said keys 110 during engagement. The second device is also preferably comprised of a plurality of U-grooves 190 each formed at a position adjoining the corresponding keyway 120 at the receiving portion 210 thereof. The U-groove 190 is preferably running parallel next to the corresponding keyway 120 to allow the corresponding key 110 to cross over (with force) from the keyway 120 to the U-groove 190 for securing the first device with the second device thereat. As such, the U-groove 190 is preferably located in advance of the keyway 120. The U-groove 190 is also preferably relatively extended to the edge of the receiving portion 210 for ease of removal of the breakable neck 140 that has been non-reattachably detached from the first periphery of the first device. The second periphery is also preferably comprised of a plurality of recesses 170 that is formed at the receiving portion 210 of the inner circumference of the second device to confine substantially the circular movement of the collars 160, as shown in FIGS. 2, 3 and 4.

With reference to FIG. 1, the cross-section of the key 110 is preferably tapered towards a screwing-in or a securing direction. Accordingly, the cross-section of the tapered slot 120 is also preferably tapered in a preferred direction to cooperatively receive the key 110. As illustrated in FIGS. 3 and 4, the cross-sections of the key 110 and the keyway 120 are preferably formed in such a manner that allow both surfaces thereof to resiliently compress against each other. With a greater force applied (in the screwing-in direction), the key 110 is preferably capable to cross over from the key-way 120 to the U-groove 190. The key 110 is then preferably prevented from moving backward to the keyway 120 (in an unscrewing or a disconnecting direction) due to the geometry and the arrangement of the U-groove 190 and the keyway 120. At the same time, the collar 160 is preferably stopped by the side-wall of the recess 170 (at the proximal end thereof) and hence, the collar 160 is preferably then restricted from a further circular movement, particularly in the disconnecting direction, as can be seen in FIGS. 3 and 4. As such, it is preferred that the recess 170 is of a length sufficient for allowing the key 110 to be initially slotted into the distal keyway 120 position and to be then actuated into the proximal U-groove 190 position.

To remove the first device, the first device is firstly unscrewed in the unscrewing direction. At this stage, the locking mechanism of the key 110 and the key-way 120, as well as the retaining mechanism of the collar 160 and the recess 170 thereof, preferably prevents substantially any movement of the lower neck 150 as well as the breakable neck 140 in relative to the receiving portion 210 of the second device. Thus, the retaining points 130, being the weakest spots of the package, is preferably ruptured if force is continually applied (preferably in the unscrewing direction). Once all the retaining points 130 are ruptured due to the said force, the breakable neck 140 is then preferably detached from the applicator 220.

It is most preferred that the first device is located below the second device during connection. To remove the detached breakable neck 140 that is held at the second device, it is preferred that the position of the second device is inverted such that the key 110 that is still retained within the U-groove 190 can be pushed downward along the said U-groove 190. As such, the detached breakable neck 140 is preferably removed easily out from the second device. Accordingly, the effective removal of the broken neck 140 preferably facilitates the second device to be reusably connectible with a new first device, which is provided with a breakable neck 140 connected to the lower neck 150 thereof. On the contrary, the used first device with the broken neck 140 is preferably rendered non-reattachably reusable with the second device again.

According to the most preferred embodiment of the present invention, the second device, is preferably screwed in a clockwise direction and unscrewed in an anti-clockwise direction, in accordance to the preferred arrangement of the keys 110, the keyways 120 with the U-grooves 190, and the collars 160 with the recesses 170, and the shape of the keys 110 and keyways 120 is tapered in the preferred operable direction.

Furthermore, it is also preferred that the key 110, the keyway 120, the U-groove 190, the collar 160, and the recess 170 are preferably orientated substantially along a spiraling path. The key 110 is preferably received into the keyway 120 and is preferably then actuated into the U-groove 190 in a spiraling slotting direction. The collar 160 is also preferably received in the spiraling slotting direction into the recess 170.

According to another preferred embodiment of the present invention, it is preferred that the key 110, the keyway 120, the U-groove 190, the collar 160, and the recess 170 are preferably orientated in a substantially sideways position. As a result, the key 110 is preferably received sideways in the slotting direction into the keyway 120 and later the U-groove 190. Also, the collar 160 is preferably slotted sideways in the slotting direction into the recess 170.

According to another preferred embodiment of the present invention, it is also preferred that the key 110, the keyway 120, the U-groove 190, the collar 160, and the recess 170 are preferably orientated in a substantially vertical position. As a result, the key 110 is preferably received downwardly in the substantially vertical slotting direction into the keyway 120 and later the U-groove 190. Also, the collar 160 is preferably slotted in the substantially vertical slotting direction into the recess 170.

According to another preferred embodiment of the present invention, it is also preferred that the key 110, the keyway 120, the U-groove 190, the collar 160, and the recess 170 are preferably orientated in a substantially inclined position. The key 110 is preferably received into the keyway 120 and is preferably then actuated into the U-groove 170 in a substantially inclined direction. The collar 160 is also preferably received in the substantially inclined direction into the recess 170.

Accordingly, a receptacle 250, a package 250, or an equivalent device, that is preferably capable of storing pourable material, such as the granular or like material, liquid, or any other pourable items; to contain material, with a mouth portion 150, is most preferably adapted as the first device whereas a dispensing conduit/applicator 220 having an inlet 180, for a dispensing machine, is most preferably adapted as the second device.

From the above description, it will be understood that the term 'lower neck' 150 referred hereinbefore, for the preferred second embodiment of the present invention, is substantially equivalent to 'the periphery of mouth portion' 150 or 'first periphery'. It will also be understood that the terms 'breakable neck' 140 referred hereinbefore, for the preferred second embodiment of the present invention, is substantially equivalent to 'non-reattachable portion' 140 or 'first connecting portion'.

It will also be understood that the term 'receiving portion' 210 referred hereinbefore, for the preferred second embodiment of the present invention, is equivalent to 'second connecting portion'. It will also be understood that the terms 'first opening' and 'second opening' referred hereinbefore, for the preferred second embodiment of the present invention, are respectively equivalent to 'mouth portion' 150 and 'inlet' 180.

Figure 5:
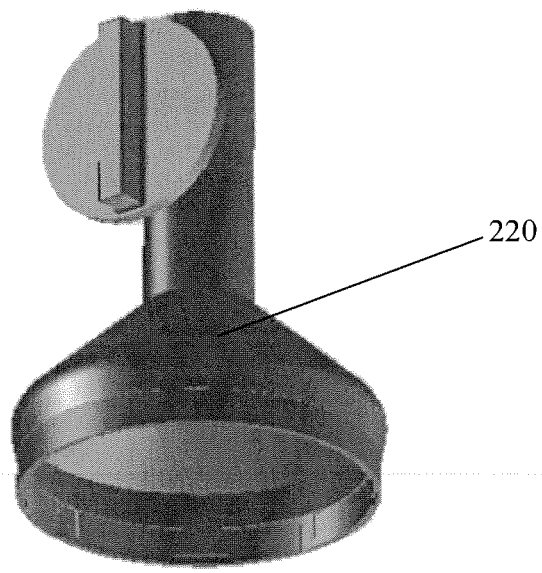
FIG. 5 is an isometric view showing the preferred method to connect the applicator to the package (container).
Figure 6:
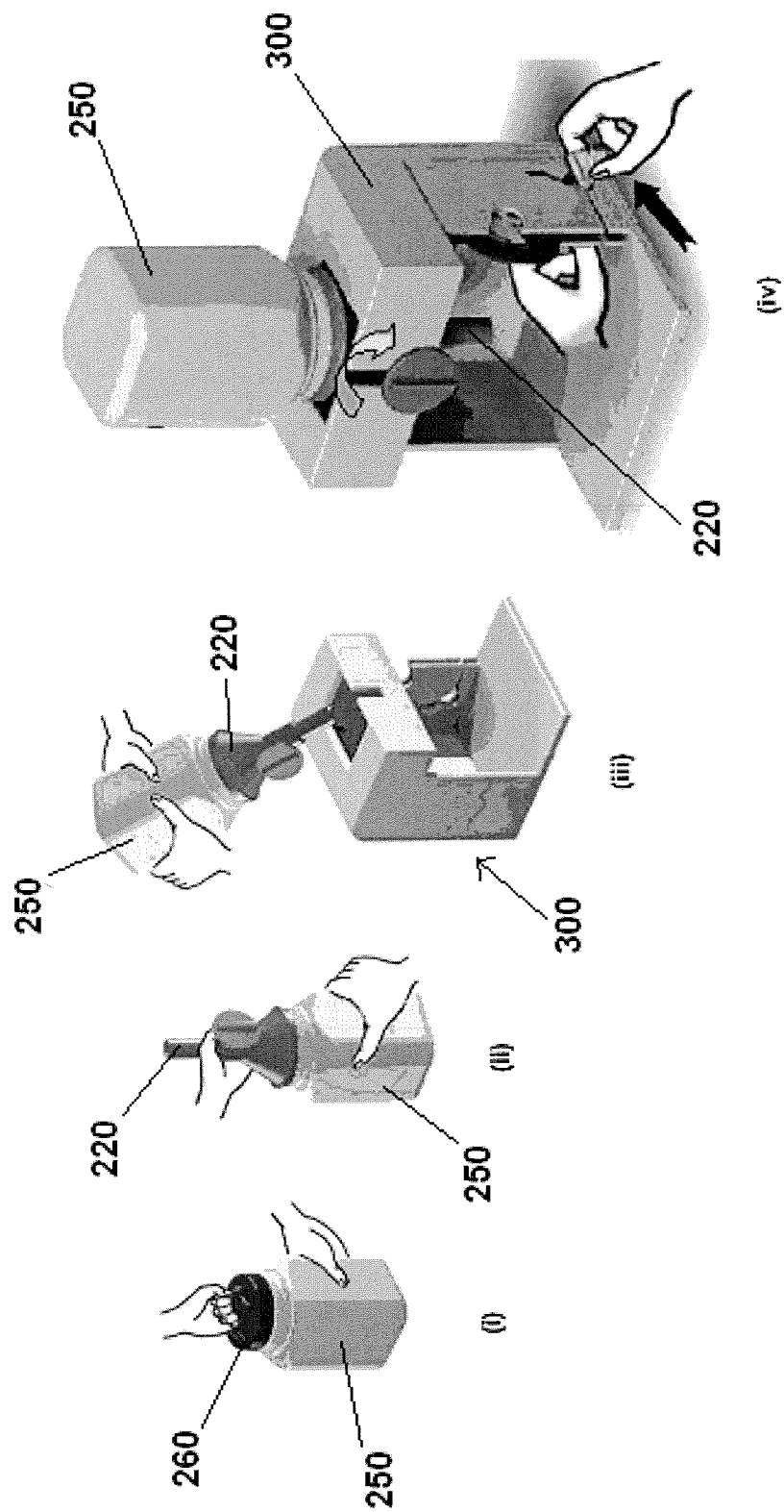
FIG. 6 is a step-by-step isometric view showing the method to adapt the package (container) to the dispensing device.

Referring again to FIGS. 5 and 6, preferably, the package 250 is initially filled with product (preferably pourable material such as granular or like material, that is preferably associated with beverage, seasoning powder, or creamer; liquid; or any other pourable items etc.). The package 250 containing the product therein is then secured preferably with a screw cap, a snap-on cover or any type of closure 260 for keeping the product in an airtight condition, as illustrated in step (i) in FIG. 6. Accordingly, to secure the package 250 onto an applicator 220, the closure 260 is preferably then removed from the package 250. As illustrated in FIG. 5 and in the step (ii) of FIG. 6, the applicator 220 is then preferably located and slotted onto the package 250 by means of aligning the keys 110 with the keyways 120. At the same time, the collars 160 of the package 250 is also preferably subsequently located into the recesses 170 of the applicator 220, to prevent the package 250 from further linear or circular movement upon their engagement later, as shown in FIGS. 3 and 4. Upon locating and slotting, the position of the collar 160 is preferably initially located at the distal end of the recess 170. As the applicator 220 is secured to the package 250, forming an assembly 220 & 250, the assembly 220 & 250 is preferably then inserted in an inverted position into the dispensing device 300 as shown in step (iii) in FIG. 6

At this stage, the package 250 is preferably secured with the applicator 220 such that the package 250 is not capable to move in either a linear or a circular movement (in the screwing-in or the unscrewing direction) relative to the applicator 220. The content in the package 250 is preferably then dispensed, by using the dispensing mechanism that is present at the applicator 220, as shown in the step (iv) in FIG. 6. Preferably, the package 250 is sealed with a sealing tape to further secure the position of the package 250 on the dispensing device 300, also as shown in the step (iv) in FIG. 6. Preferably, with reference to the step (iv) in FIG. 6, while the applicator 220 is still mounted in the dispensing position at the dispensing device 300 at this stage, and while the key 110 is still retained within the U-groove 190, upon disconnection of the package 250 from the applicator 220, the detached breakable neck 140 is preferably left to stay at the applicator 220, whilst the detached non-reattachable package 250 is preferably free to be removed from the applicator 220.

In order to remove the detached breakable neck 140 that is held at the second device, it is preferred that the applicator 220 is removed from the dispensing device 300 and the position of the applicator 220 is inverted such that the key 110, that is still retained within the U-groove 190, is preferably pushed downward along the U-groove 190. As such, the detached breakable neck 140 is then capable of being removed out from the applicator 220. Accordingly, the effective removal of the broken neck 140 facilitates the applicator 220 such that it is reusably connectible with a new package 250, which is provided with a breakable neck 140 connected to the lower neck 150 thereof. On the contrary, the used package 250 with the broken neck 140 is preferably rendered non-reattachably reusable with the applicator 220 again.

It is preferred that the dispensing conduit is an applicator 220 that is detachable from the dispensing device 300. Accordingly, the receptacle 250 is preferably a package 250 that is configured to be non-reattachably connected to the inlet of the applicator 220. The securing system 500 is preferably configured to prevent the connection of other packages with the applicator 220. The securing system 500 also preferably prevents re-using or refilling a package 250 that has been disconnected from the applicator 220. The securing system 500 preferably further facilitates one-time usage of a package 250 with the applicator 220.

According to a preferred third embodiment of the present invention, the first device is preferably adapted to serve as an intermediate connector between a third and the second devices at the second and a third openings. To that end, the first opening is preferably extended through the first device as a conduit thereof. It is preferred that the first device is non-detachably connected to a third device. It is also preferred that the first device is non-detachably mounted onto the third device. If the first and the second devices are preferably non-reattachably connected, when the first device is caused to be disconnected from the second device, the third device, which is preferably non-detachably connected to the first device, is preferably disabled from being re-attachable with the second device.

Accordingly, the third device is preferably comprised of a third opening that is formed by a third periphery thereof. The third periphery is preferably comprised of a third connecting component formed on the outer wall thereof. Accordingly, the first periphery is preferably further comprised of an inner connecting component formed on the inner wall thereof. The inner connecting component is preferably non-detachably engaged with the third connecting component such that the first device and the third device are non-detachably connected at the first and the third openings. It is also preferred that other non-detachable means is preferably adapted to non-detachably connect the first and the third devices at the corresponding first and third openings.

Figure 7:
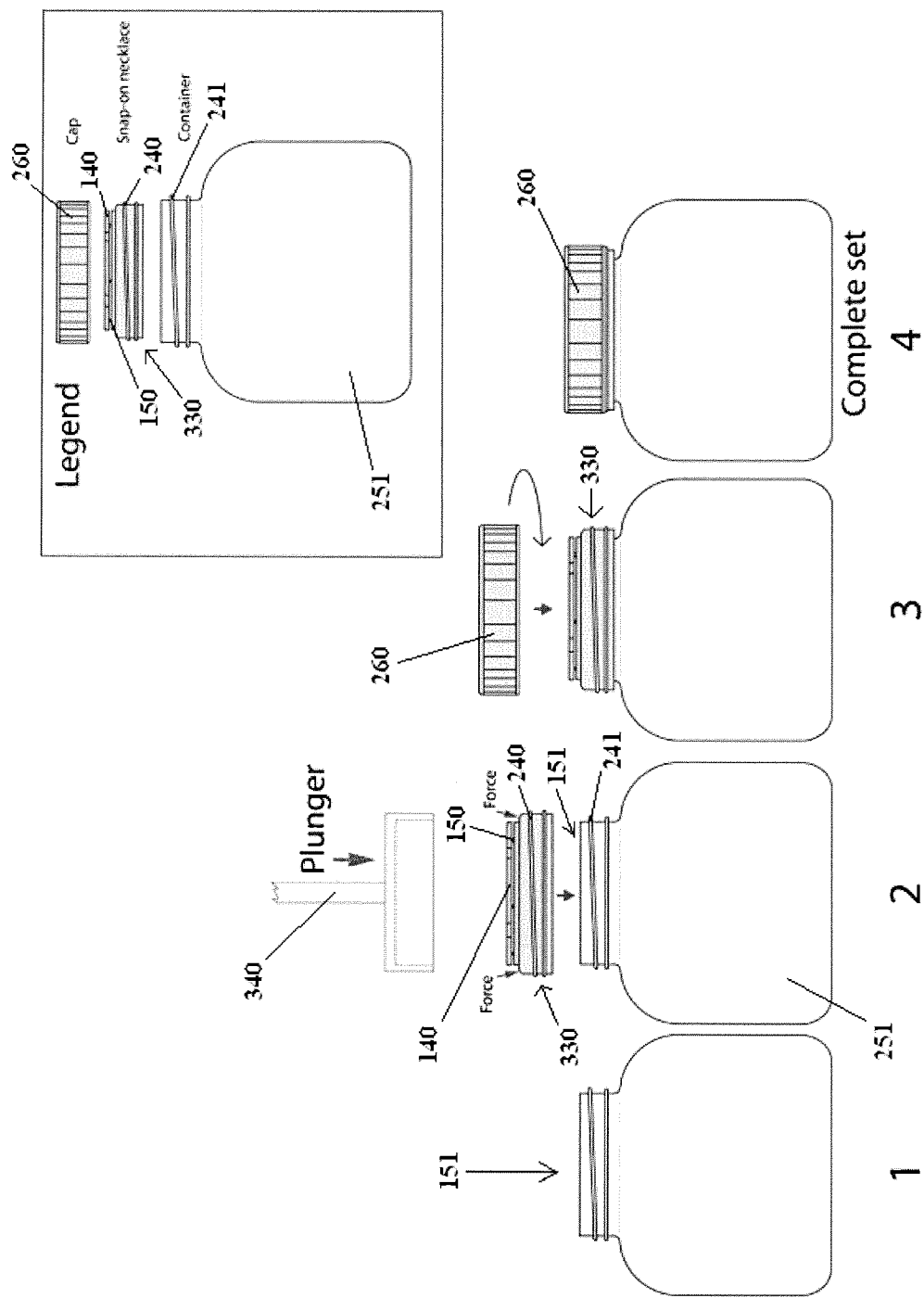
FIG. 7 shows an intermediate connector and a container of the third embodiment of the present invention.

Referring now to FIG. 7, a plunger fixture 340 is shown. It is preferred that the first device is preferably non-detachably engaged with the third device by means of a plunger fixture 340. As afore-mentioned that the first device is preferably non-detachably mounted onto the third device, it is also preferred that the plunger fixture 340 is firstly placed on top of the first device. Force is then applied to the plunger fixture 340 from the top such that the inner connecting component is non-detachably engaged with the third connecting component. The third device and the first device are preferably non-detachably connected at the corresponding third and first openings at this stage. Upon the connection, the plunger fixture is preferably removed from the top of the first device and a second device is preferably then connected to the first device such that the openings of the second and third devices are connected.

It is also preferred that the first device is further comprised of at least one indicative marking for guiding a user to connect the first device to the third device. The first and third devices are preferably connected at the first and the third openings in accordance to the position of the indicative marking in relative to the third connecting component.

Referring again to FIG. 7, a receptacle 251 is preferably adapted as the third device. The receptacle 251 is preferably comprised of a mouth portion 151. The mouth portion 151 is preferably adapted as the third opening whilst the periphery of the mouth portion 151 is preferably adapted as the third periphery. The periphery of the mouth portion is preferably comprised of a receptacle connecting component formed at the outer wall thereof. Accordingly, the receptacle connecting component is adapted as the third connecting component. The receptacle connecting component is preferably comprised of a receiving thread 241. It is also preferred that the indicative marking is positioned substantially between the ends of the receiving thread for guiding the first and third devices to be connected at the first and the third openings. It is further preferred that the receptacle 251 is configured to be filled with pourable material such as granular or like material, liquid and other pourable items.

According still to the third embodiment of the present invention, it is further preferred that an inlet 180 is adapted as the second device. The inlet 180 is preferably adapted as the second opening. The inlet 180 is also preferably configured for a dispensing conduit of a dispensing device 300. The inlet 180 preferably comprises a receiving portion 210 that is formed at the periphery that forms the inlet 180. The receiving portion 210 is preferably adapted as the second connecting portion.

The dispensing conduit is preferably an applicator 220 that is detachable from the dispensing device 300. The receptacle 251 is preferably a package. The receptacle 251 is preferably configured to be non-reattachably connected with the inlet 180 of the applicator 220 by means of the first device. In similar fashion to the first and the second embodiments of the present invention, the securing system 500, according to the third embodiment of the present invention, is also configured to prevent connection of other packages with the applicator 220, to prevent re-using or refilling a package that has been disconnected from the applicator 220, and to facilitate one-time usage of a package with the applicator 220. Accordingly, the first device, according to the third embodiment of the present invention, is most preferably a snap-on ring 330 that is formed in such a manner that it is capable of being easily snapped onto another receptacle 251.

Referring again to FIG. 7, the first periphery is also preferably comprised of an engagement thread such as a screw or receiving thread 240 formed below the collars (not shown) for engagement with a closure 260 such as a screw cap, a snap-on cover or any type of appropriate closure 260.

While in the foregoing specification this invention has been described in relation to certain preferred embodiments thereof and many details have been set forth for purpose of illustration, it will be apparent to those skilled in the art that the invention is susceptible to additional embodiments and that certain of the details described herein can be varied considerably without departing from the basic principles of the invention.

The invention claimed is:

1. A securing system comprising:
   a first device, comprising a first opening, and a first connecting portion formed at a first periphery that forms the first opening;
   a second device, comprising a second opening, and a second connecting portion formed at a second periphery that forms the second opening;
   the first connecting portion configured to be engaged with the second connecting portion for connecting the first opening with the second opening,
   the first connecting portion configured to non-reattachably deform when the first device is caused to be disconnected from the second device at the connected first and second openings for disabling the first device from being re-attachable with the second device at the first and second openings, and the first periphery comprising a tapered key that intermeshes with a tapered slot in the second periphery, the second periphery comprising a U-shaped groove adjoining the slot and positioned parallel to the slot, and the tapered slot and the U-shaped groove extending into an inner surface of the second periphery that faces the first periphery.

2. A securing system of claim 1 wherein the first connecting portion comprises:

at least one securing element formed thereat, and the second connecting portion comprises at least one receiving element formed thereat, the securing element is configured to be received and retained in the receiving element when the first connecting portion is connected to the second connecting portion; and the securing element is retained at the receiving element in such a manner that the action of disconnecting the first device and the second device at the connected first and second openings would non-reattachably deform the securing element or the first connecting portion for disabling the first device from being re-attachable with the second device at the first and second openings.

3. A securing system of claim 2 wherein:

the first device is adapted at the first opening to be not re-attachable with the second device at the second opening once the connected first and second openings are caused to be disconnected; and the second connecting portion is capable to engage a first connecting portion of a replacement first device that has not been attached to the second device and has not been non-reattachably deformed as a result of disconnection from a second device at the corresponding openings.

4. A securing system of claim 1 wherein the first periphery comprises:

at least one collar formed at an engagement wall thereof, and the second periphery comprises at least one receiver formed at an engagement wall thereof;

the collar is configured to be correspondingly received into the receiver when the first and second openings are in the connected position; and the collar is further configured to restrict substantially any movement of the first opening as relative to the second opening.

5. A securing system of claim 1 wherein:

the first connecting portion is adapted as a non-reattachable portion frangibly connected to the first periphery; and the non-reattachable portion is configured to be frangibly detached from the first periphery when the first device is caused to be disconnected from the second device at the connected first and second openings.

6. A securing system of claim 5 wherein:

the first device comprises at least one frangible connecting element formed along the connection between the non-reattachable portion and the first periphery; and the frangible connecting element is for frangibly connecting the non-reattachable portion to the first periphery.

7. A securing system of claim 6 wherein the securing element comprises:

a tapered key formed at the engagement wall of the non-reattachable portion and the receiving element comprises a tapered slot and a corresponding groove adjoining the tapered slot; and both the tapered slot and the groove are formed at the engagement wall of the second periphery.

8. A securing system of claim 7 wherein:

the tapered key is adapted to be slotted into the tapered slot when the non-reattachable portion is being engaged to the second connecting portion; the cross-section of the tapered key tapers towards a slotting direction;

the cross-section of the tapered slot is tapered in such a manner to cooperatively receive the tapered key;

the tapered cross-sections are formed in such a manner that allows both contacting surfaces of the tapered key and slot to compress against each other; and the groove is located in front of the tapered slot according to the slotting direction.

9. A securing system of claim 8 wherein the tapered key and slot are adapted to be resiliently displaceable such that the tapered key is actuatable into the groove in the slotting direction for securing the connection between the first opening and the second opening.

10. A securing system of claim 9 wherein:

the groove is defined such that the tapered key once actuated into the groove is prevented from being actuated out from the groove and from moving back to the tapered slot when the non-reattachable portion is being disconnected from the second connecting portion in a disconnecting direction;

the groove is configured to retain the tapered key therein such that the non-reattachable portion is enabled to be detached from the first periphery at the at least one frangible connecting element; and the groove is defined such that the tapered key can be removed from the groove.

11. A securing system of claim 10 wherein:

to engage the non-reattachable portion with the second connecting portion, the tapered key is caused to be slotted into the corresponding tapered slot in the slotting direction while simultaneously, the collar is correspondingly slotted at the distal end of the receiver such that the non-reattachable portion is in a slotted position;

the tapered key is then caused to be actuated into the groove with further force is being accordingly applied and the collar is then correspondingly pushed to a stalled position at the proximal end of the receiver such that the non-reattachable portion is in the secured position; and at the secured position, the movement of the first periphery in relative to the second connecting portion is restricted by the collar at the receiver.

12. A securing system of claim 11 wherein to disconnect the first device from the second device at the connected first and second openings, the collar are caused to be pushed in the corresponding disconnecting direction towards the distal end of the receiver while the groove retains the tapered key therein such that the continual application of force results to the frangible connecting element to rupture subsequently causing the non-reattachable portion to be detached from the first periphery at the at least one frangible connecting element.

13. A securing system of claim 11 wherein the receiver is of a length sufficient for allowing the tapered key to be slotted into the tapered slot position and the tapered key to be actuated into the groove position.

14. A securing system of claim 13 wherein when the non-reattachable portion is in the secured position, the receiver is adapted to retain the collar at the proximal end thereof such that the tapered key is prevented from further traversed out from the groove in the slotting direction.

15. A securing system of claim 14 wherein:

the tapered key, the tapered slot, the groove, the collar, and the receiver are accordingly orientated in a sideways position such that the tapered key is caused to be slotted sideways in the slotting direction into the tapered slot and the collar is simultaneously caused to be slotted sideways in the slotting direction into the receiver; and the tapered key is subsequently caused to be actuated sideways into the groove.

16. A securing system of claim 14 wherein:

the tapered key, the tapered slot, the groove, the collar, and the receiver are orientated substantially along a spiraling path such that the tapered key is caused to be slotted in a spiraling slotting direction into the tapered slot and the collar is simultaneously caused to be slotted in the spiraling slotting direction into the receiver; and the tapered key is subsequently caused to be actuated in the spiraling slotting direction into the groove.

17. A securing system of claim 14 wherein:

the tapered key, the tapered slot, the groove, the collar, and the receiver are orientated in a substantially vertical position such that the tapered key is caused to be slotted downwards in the vertical slotting direction into the tapered slot and the collar is simultaneously caused to be slotted in the vertical slotting direction into the receiver; and the tapered key is subsequently caused to be actuated in the vertical slotting direction into the groove.

18. A securing system of claim 14 wherein:

the tapered key, the tapered slot, the groove, the collar, and the receiver are orientated in a substantially inclined direction such that the tapered key is caused to be slotted in a substantially inclined direction into the tapered slot and the collar is simultaneously caused to be slotted in the substantially inclined direction into the receiver; and the tapered key is subsequently caused to be actuated in the substantially inclined direction into the groove.

19. A securing system of claim 14 wherein:

the first device further comprises a closure configured for detachably closing the mouth of the first device; the first periphery further comprises a first connecting component formed at the outer wall thereof;

the closure comprises a head, a skirt extending from the head, and a closure connecting component formed at the inner wall of the skirt; and the closure connecting component is configured to be engaged with the first connecting component such that the closure is secured at the mouth of the first device.

20. A securing system of claim 19 wherein:

the closure connecting component comprises a securing thread, and the first connecting component comprises a receiving thread; and the securing thread is configured to be correspondingly engaged with the receiving thread.

21. A securing system of claim 20 wherein:

a receptacle is adapted as the first device, and an inlet is adapted as the second device;

the receptacle comprises a mouth portion and a securing portion; the mouth portion is adapted as the first opening;

the securing portion is adapted as the non-reattachable portion; the non-reattachable portion is frangibly connected to the first periphery;

the non-reattachable portion is configured to act as an extension from the mouth portion;

the inlet is the second opening; the inlet is configured for a dispensing conduit of a dispensing device;

the inlet comprises a receiving portion formed at the periphery of the inlet; and the receiving portion is adapted as the second connecting portion.

22. A securing system of claim 21 wherein:

the dispensing conduit is an applicator detachable from the dispensing device and the receptacle is a package configured to be non-reattachably connected to the inlet of the applicator; and the securing system is configured to prevent adaptation of other packages to be connected with the applicator, to prevent re-using or refilling a package that has been disconnected from the applicator, and to facilitate one-time usage of a package with the applicator.

23. A securing system of claim 22 wherein the receptacle is configured to be filled with pourable material selected from the group consisting of granular or like material, liquid and other pourable items.

24. A securing system of claim 20 wherein the first device is non-detachably connected to a third device; and the first opening is extended through the first device as a conduit thereof.

25. A securing system of claim 24 wherein:

the first periphery further comprises an inner connecting component formed on the inner wall thereof;

the third device comprises a third opening; a third periphery, that forms the third opening;

a third connecting component formed on the outer wall thereof; and the inner connecting component is non-detachably engaged with the third connecting component such that the first device and the third device are non-detachably connected at the first and the third openings.

26. A securing system of claim 25 wherein:

the first device is non-detachably engaged with the third device by means of a plunger fixture;

the first device is non-detachably mounted onto the third device; and the plunger fixture is placed on top of the first device, and force is applied to the plunger fixture from the top such that the inner connecting component is non-detachably engaged with the third connecting component.

27. A securing system of claim 26 wherein the first device comprises at least one indicative marking for guiding a user to connect the first device to the third device; the first and third devices are connected at the first and the third openings in accordance to the position of the indicative marking in relative to the third connecting component.

28. A securing system of claim 27 wherein:

a receptacle is adapted as the third device;

the receptacle comprises of a mouth portion;

the mouth portion is adapted as the third opening;

the periphery of the mouth portion, which is adapted as the third periphery, comprises a receptacle connecting component formed at the outer wall thereof, which is adapted as the third connecting component;

the receptacle connecting component comprises a receiving thread; and the indicative marking is positioned substantially between the ends of the receiving thread for guiding the first and third devices to be connected at the first and the third openings.

29. A securing system of claim 28 wherein:

the first device is an intermediate connector between the second and the third devices at the second and the third openings; an inlet is adapted as the second device;

the inlet is the second opening;

the inlet is configured for a dispensing conduit of a dispensing device;

the inlet comprises a receiving portion formed at the periphery of the inlet; and the receiving portion is adapted as the second connecting portion.

30. A securing system of claim 29 wherein:
the dispensing conduit is an applicator detachable from the dispensing device and the receptacle is a package configured to be non-reattachably connected with the inlet of the applicator by means of the first device; and
the securing system is configured to prevent adaptation of other packages to be connected with the applicator, to prevent re-using or refilling a package that has been disconnected from the applicator, and to facilitate one-time usage of a package.

31. A securing system of claim 30 wherein the receptacle is configured to be filled with pourable material selected from the group consisting of granular or like material, liquid and other pourable items.

\* \* \* \* \*